(12) United States Patent
Kim et al.

(10) Patent No.: US 12,319,124 B2
(45) Date of Patent: Jun. 3, 2025

(54) INTEGRATED AIR-CONDITIONING SYSTEM

(71) Applicants: Kia Corporation, Seoul (KR); Hyundai Motor Company, Seoul (KR)

(72) Inventors: Ki Mok Kim, Busan (KR); Sang Shin Lee, Suwon-si (KR); Man Ju Oh, Yongin-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 216 days.

(21) Appl. No.: 18/063,033

(22) Filed: Dec. 7, 2022

(65) Prior Publication Data
US 2024/0034124 A1 Feb. 1, 2024

(30) Foreign Application Priority Data
Aug. 1, 2022 (KR) .......................... 10-2022-0095520

(51) Int. Cl.
*B60H 1/00* (2006.01)
(52) U.S. Cl.
CPC ..... *B60H 1/00921* (2013.01); *B60H 1/00278* (2013.01); *B60H 2001/00307* (2013.01); *B60H 2001/00928* (2013.01)
(58) Field of Classification Search
CPC ............ B60H 1/00921; B60H 1/00278; B60H 1/32281; B60H 2001/00307; B60H 2001/00928; B60H 2001/3291
See application file for complete search history.

(56) References Cited

U.S. PATENT DOCUMENTS

2017/0174038 A1* 6/2017 Scheldel .............. B60H 1/3213
2018/0072130 A1* 3/2018 Kim .................... B60H 1/00278

FOREIGN PATENT DOCUMENTS

KR      20080092527 A     10/2008

* cited by examiner

Primary Examiner — Miguel A Diaz
(74) Attorney, Agent, or Firm — Slater Matsil, LLP

(57) ABSTRACT

In an embodiment a system includes a compressor, an indoor heat exchanger, an outdoor heat exchanger, a switch vale, an integrated heat exchanger a first expander and a second expander connected to the refrigerant line, wherein the switch valve is configured to selectively circulate a refrigerant from the compressor either first to the indoor heat exchanger or first to the outdoor heat exchanger, wherein the integrated heat exchanger is configured to receive the refrigerant from the indoor heat exchanger or the outdoor heat exchanger, wherein the integrated heat exchanger is configured to act as a heat pump exchanging heat between the refrigerant and a heat exchange medium, wherein the first expander is configured to selectively expand the refrigerant related to the indoor heat exchanger, wherein the second expander is configured to selectively expand the refrigerant related to the integrated heat exchanger, and a controller configured to control refrigerant circulation directions through the switching valve according to a cooling mode, a heating mode, or a dehumidification mode such that the indoor heat exchanger is able to generate air-conditioning air based on each mode.

20 Claims, 8 Drawing Sheets

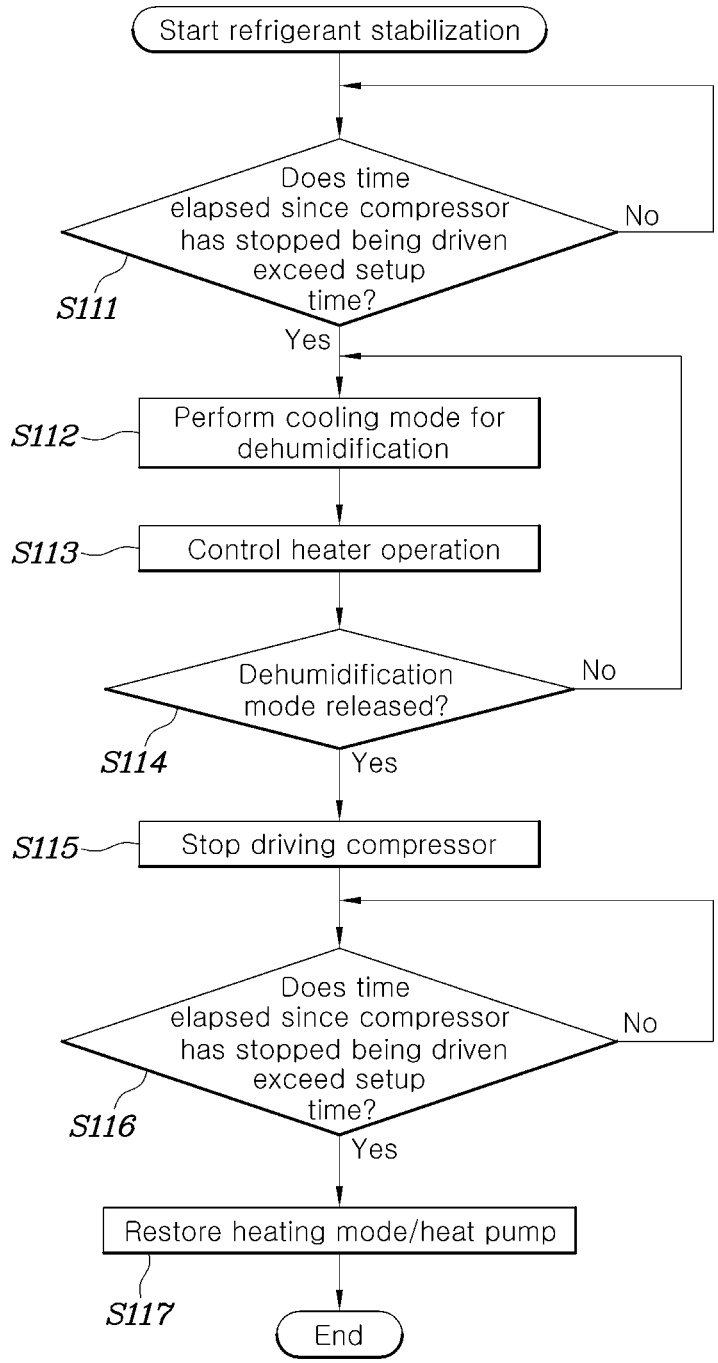

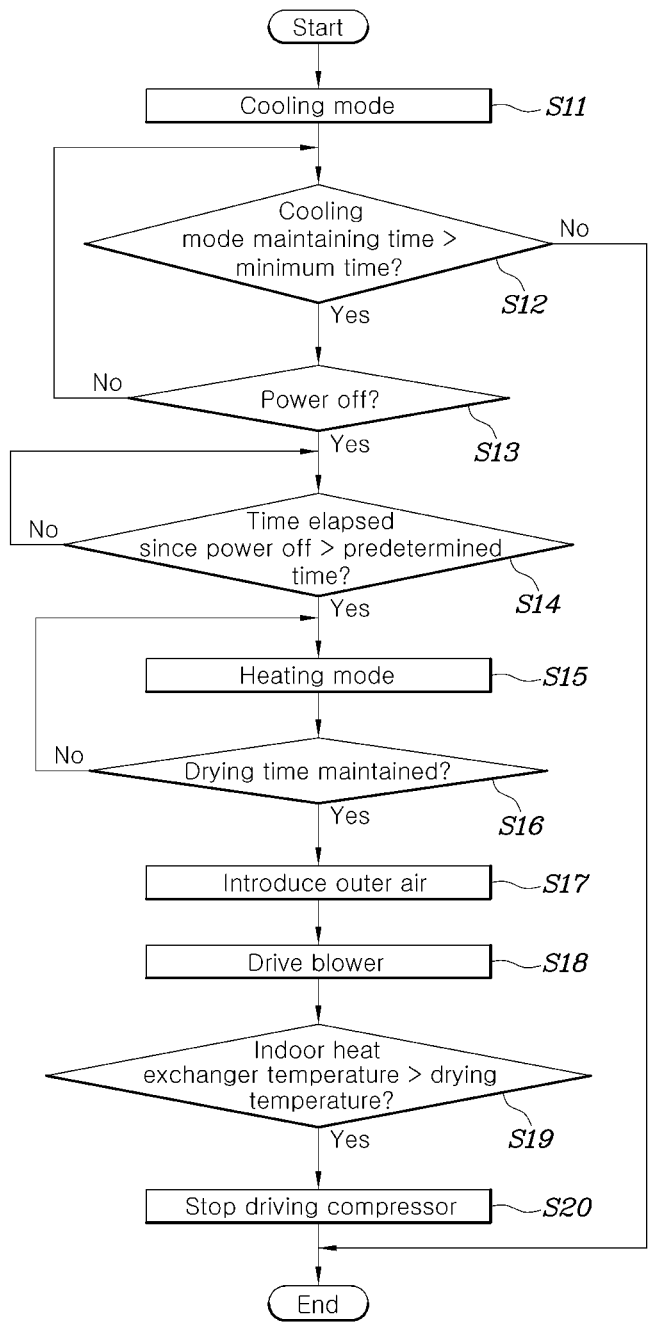

INTEGRATED AIR-CONDITIONING SYSTEM

CROSS-REFERENCE TO RELATED APPLICATIONS

This application is based on and claims priority under 35 U.S.C. § 119 to Korean Patent Application No. 10-2022-0095520, filed on Aug. 1, 2022, in the Korean Intellectual Property Office, the disclosure of which is herein incorporated by reference in its entirety.

TECHNICAL FIELD

The present disclosure relates to an integrated air-conditioning system wherein the temperature of air-conditioning air provided to an indoor space is adjusted by a single heat exchanger, thereby simplifying the cooling circuit, and no temperature adjustment door is used to adjust the temperature of air-conditioning air with regard to each mode, thereby reducing the air conditioner package.

BACKGROUND

Electric cars have recently emerged in connection with social issues regarding implementation of eco-friendly technologies, energy depletion, and the like. Electric cars operate by using motors that receive electricity from batteries and output power. Electric cars are advantageous in that carbon dioxide is not discharged, noise is neglectable, and the energy efficiency of motors is higher than that of engines, thereby making electric cars eco-friendly.

Technologies related to battery modules are crucial to implementing such electric cars, and there has recently been extensive research to make batteries lightweight and compact, and to shorten the charging time. Battery modules can maintain optimal performance and long lifespan only when they are used in optimal temperature environments. However, heat generated during driving and external temperature changes make it difficult to use battery modules in optimal temperature environments.

In addition, electric cars worn indoor spaces of the cars in winter by using electric heating devices because they have no waste heat source generated by combustion in separate engines (for example, internal combustion engines). Electric cars also need to be warmed up to improve the battery charging/discharging performance in extremely cold seasons, and cooling water heating-type electric heaters are separately configured and used to this end. That is, in order to maintain optimal temperature environments for battery modules, cooling/heating systems for battery module temperature adjustment are operated separately from cooling/heating systems for vehicle indoor air conditioning.

In the case of an air-conditioning system for vehicle indoor air conditioning, a heat pump technology for minimizing heating energy consumption is applied to increase the traveling distance, thereby minimizing the amount of consumed energy. The air-conditioning system includes a temperature adjustment door for selectively adjusting provision of cooling air and heating air, and respective parts related to the evaporator and the heater are disposed to be spaced apart from each other, thereby increasing the overall size.

The above descriptions regarding background technologies have been made only to help understanding of the background of the present disclosure, and are not to be deemed by those skilled in the art to correspond to already-known prior arts.

SUMMARY

Embodiments provide an integrated air-conditioning system wherein the temperature of air-conditioning air provided to an indoor space is adjusted by a single heat exchanger, thereby simplifying the cooling circuit, and no temperature adjustment door is used to adjust the temperature of air-conditioning air with regard to each mode, thereby reducing the air conditioner package.

Various embodiments provide an integrated air-conditioning system which may include: An integrated air-conditioning system comprising: a refrigerant line through which refrigerant is circulated; a compressor provided on the refrigerant line, for compressing refrigerant; an indoor heat exchanger and an outdoor heat exchanger provided on the refrigerant line, to which refrigerant is introduced after passing through the compressor; a switching valve provided on the refrigerant line, configured such that refrigerant discharged from the compressor is selectively circulated to the indoor heat exchanger or the outdoor heat exchanger; an integrated heat exchanger provided on the refrigerant line, disposed such that refrigerant is introduced therein after passing through the indoor heat exchanger or the outdoor heat exchanger, wherein the integrated heat exchanger is configured to implement a heat pump through heat exchange with a different heat exchange medium; a first expander provided on the refrigerant line, configured to selectively expand refrigerant introduced into the indoor heat exchanger; a second expander provided on the refrigerant line, configured to selectively expand refrigerant introduced into the integrated heat exchanger; and a controller configured to control respective expanders and refrigerant circulation directions through the switching valve according to a cooling mode, a heating mode, or a dehumidification mode such that air-conditioning air appropriate for each mode is generated through the indoor heat exchanger.

The integrated air-conditioning system may further include a first cooling-water line along which cooling water is circulated, the first cooling-water line including a first water pump, a PE part, a first radiator, and a first valve, and the first cooling-water line being connected to the integrated heat exchanger such that cooling water exchanges heat with refrigerant, thereby ensuring that cooling water is selectively circulated to the first radiator or the integrated heat exchanger by the first valve.

The integrated air-conditioning system may further include a second cooling-water line along which cooling water is circulated, the second cooling-water line including a second water pump, a battery, a second radiator, and a second valve, and the second cooling-water line being connected to the integrated heat exchanger such that cooling water exchanges heat with refrigerant, thereby ensuring that cooling water is selectively circulated to the second radiator or the integrated heat exchanger by the second valve.

The controller may receive an input regarding whether the compressor is driven as a result of performing the heat pump or cooling/heating mode in the dehumidification mode, and may ensure that, when the compressor is not driven, outer air is defrosted/discharged.

The controller may control the switching valve in the cooling mode such that refrigerant discharged from the compressor is circulated to the outdoor heat exchanger, the controller may ensure that the first expander undergoes an expanding operation, thereby forming cooling air in the indoor heat exchanger, and the controller may ensure that the second expander undergoes a selective expanding operation, thereby implementing the heat pump through heat exchange between the refrigerant and the heat exchange medium.

The controller may control the switching valve in the heating mode such that refrigerant discharged from the compressor is circulated to the indoor heat exchanger, thereby forming heating air in the indoor heat exchanger, and the controller may ensure that the first expander undergoes an expanding operation, and the second expander undergoes a selective opening operation, thereby implementing the heat pump through heat exchange between the refrigerant and the heat exchange medium.

The integrated air-conditioning system may further include a heater configured to form heating air according to whether the heater operates, and the controller may operate the heater when an indoor temperature condition is not satisfied solely by heating air generated in the indoor heat exchanger.

The controller may receive an additional input of outer air temperature information through a temperature sensor in the case of dehumidification mode during the heating mode, and the controller may ensure that outer air is defrosted/discharged when outer air temperature is below a setup temperature.

The controller may receive an input of outer air temperature information in the case of dehumidification mode during the heating mode, the controller may stop driving of the compressor when outer air temperature is equal to/higher than a setup temperature, and the controller may adjust temperature of heating air by controlling the heater.

The controller may receive an additional input of refrigerant pressure information through a refrigerant pressure sensor, and may ensure that control related to the cooling mode is performed if the refrigerant pressure is equal to/lower than a reference refrigerant pressure after the compressor has stopped being driven.

The controller may ensure that the compressor stops being driven if the dehumidification mode is released, and the controller may ensure that control related to the heating mode is performed if the refrigerant pressure is equal to/lower than the reference refrigerant pressure after the compressor has stopped being driven.

The controller may pre-store a setup time at which the refrigerant pressure reaches the reference refrigerant pressure after the compressor stops being driven, and the controller may ensure that control related to the cooling mode is performed if a time elapsed since the compressor stops being driven exceeds a setup time.

The controller may ensure that the compressor stops being driven if the dehumidification mode is released, and the controller may ensure that control related to the heating mode is performed if a time elapsed since the compressor has stopped being driven exceeds a setup time.

In the case of power off after cooling air is formed through the indoor heat exchanger, the controller may identify whether a time elapsed since the power off exceeds a predetermined time, and the controller may ensure that control related to the heating mode is maintained for a preset drying time if the predetermined time is exceeded.

The controller may ensure that outer air is introduced, a blower is driven, and the compressor stops being driven if temperature of the indoor heat exchanger elevated by the heating mode reaches a preset drying temperature.

An integrated air-conditioning system according to the above embodiments is advantageous in that the temperature of air-conditioning air provided to an indoor space is adjusted by a single heat exchanger, thereby simplifying the cooling circuit, and no temperature adjustment door is used to adjust the temperature of air-conditioning air with regard to each mode, thereby reducing the air conditioner package.

In addition, according to embodiments, when a single indoor heat exchanger is used for dehumidification, the pressure of refrigerant circulated in the indoor heat exchanger is stabilized, thereby stabilizing parts on the refrigerant line, and the heat-absorbing or heat-radiating operation of the indoor heat exchanger is optimized.

BRIEF DESCRIPTION OF THE DRAWINGS

The above and other aspects, features, and advantages of the present disclosure will be more apparent from the following detailed description taken in conjunction with the accompanying drawings, in which:

FIG. 7 is a flowchart illustrating another embodiment related to refrigerant stabilization in connection with the control flowchart illustrated in FIG. 5; and FIG. 8 is a control flowchart related to dehumidification by an integrated air-conditioning system according to the present disclosure.

DETAILED DESCRIPTION OF ILLUSTRATIVE EMBODIMENTS

Figure 1:
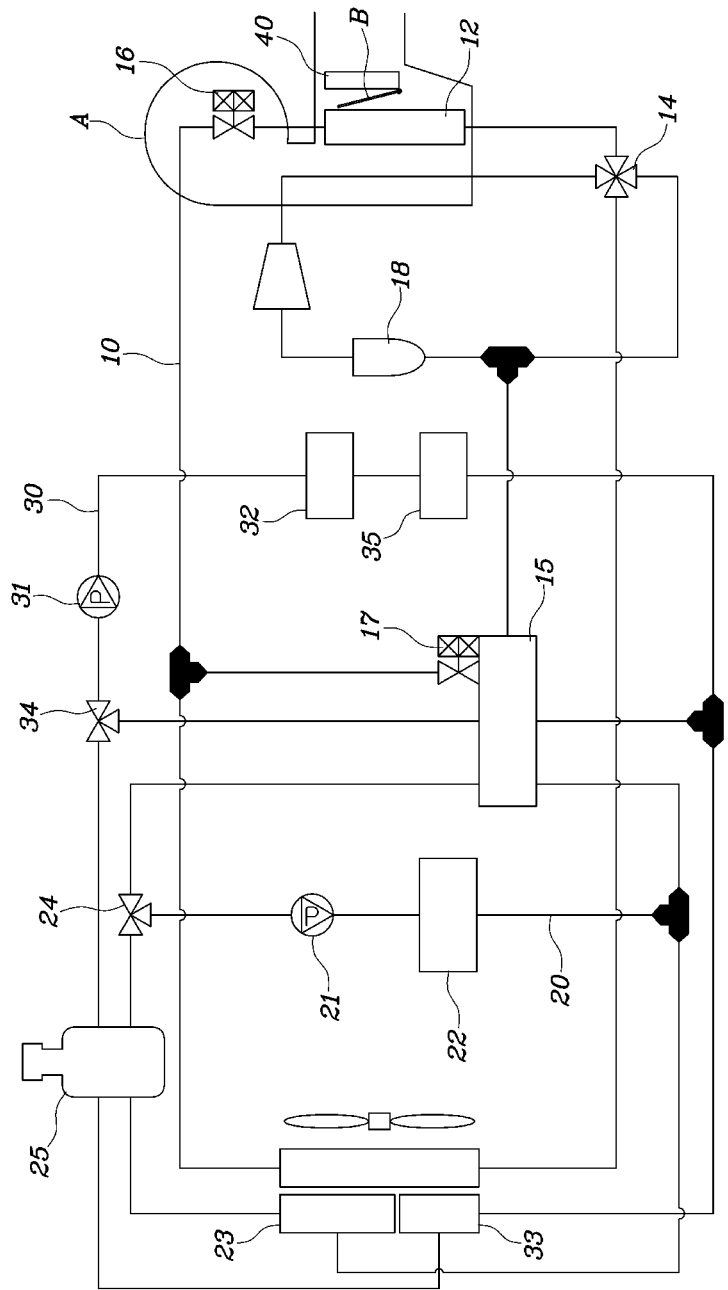
FIG. 1 illustrates an integrated air-conditioning system according to the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A controller may include a communication device configured to communicate with a sensor or another control unit, a memory configured to store an operation system, a logic command, or input/output information, and at least one processor configured to perform determination, calculation, decision or the like which are required for responsible function controlling.

Figure 2:
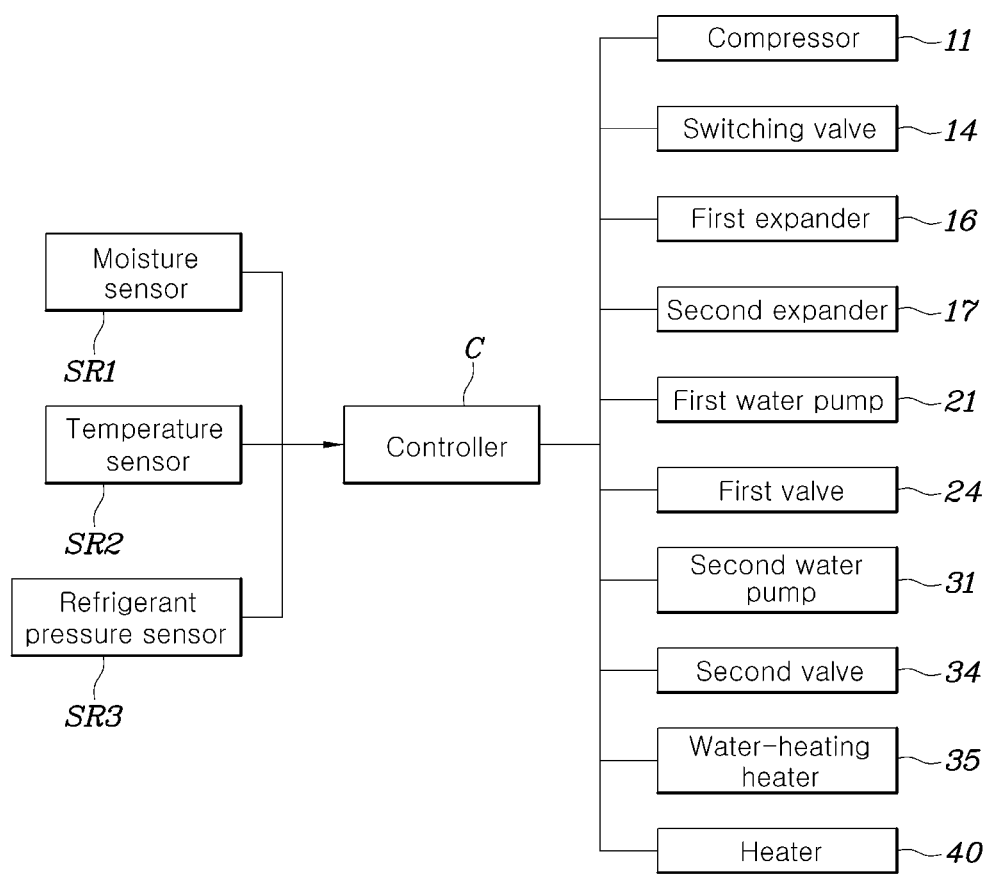
FIG. 2 illustrates the configuration of an integrated air-conditioning system according to the present disclosure.

FIG. 1 illustrates an integrated air-conditioning system according to the present disclosure. FIG. 2 illustrates the configuration of an integrated air-conditioning system according to the present disclosure.

Figure 3:
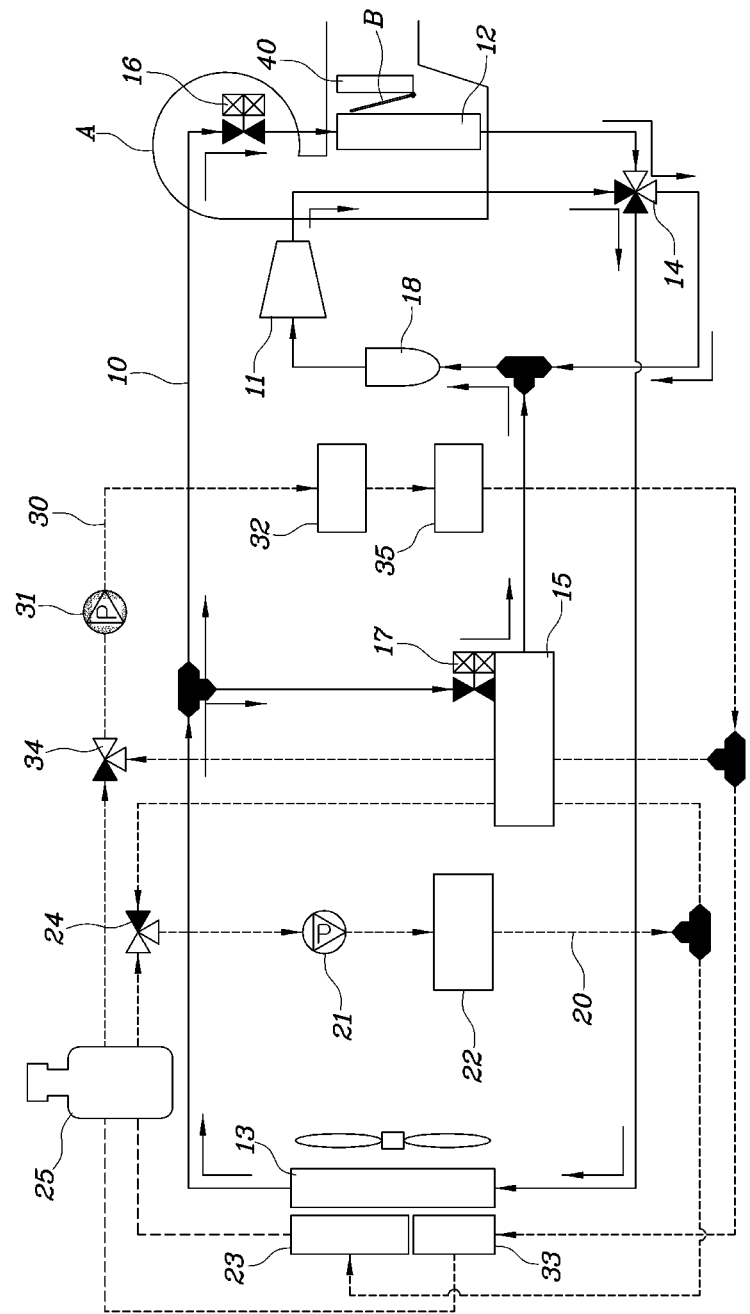
FIG. 3 illustrates a cooling mode of the integrated air-conditioning system illustrated in FIG. 1.
Figure 4:
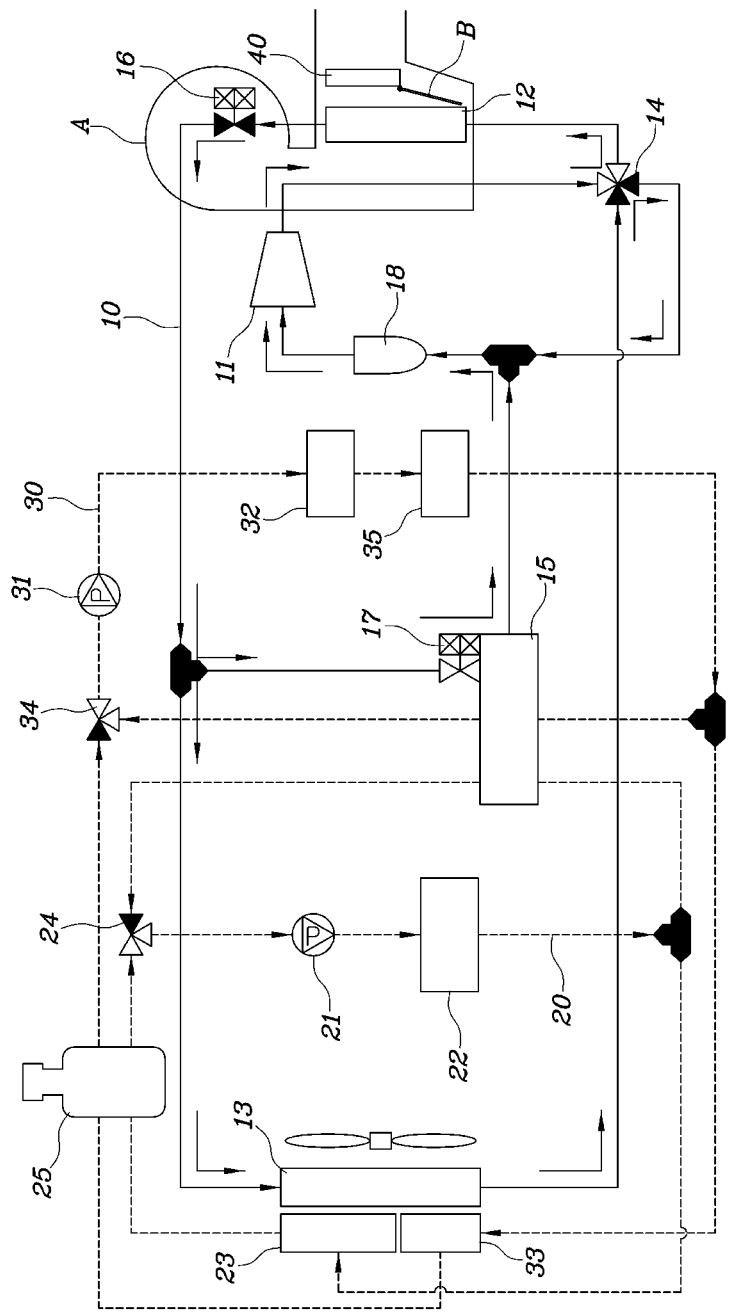
FIG. 4 illustrates a heating mode of the integrated air-conditioning system illustrated in FIG. 1.

FIG. 3 illustrates a cooling mode of the integrated air-conditioning system illustrated in FIG. 1. FIG. 4 illustrates a heating mode of the integrated air-conditioning system illustrated in FIG. 1.

Figure 5:
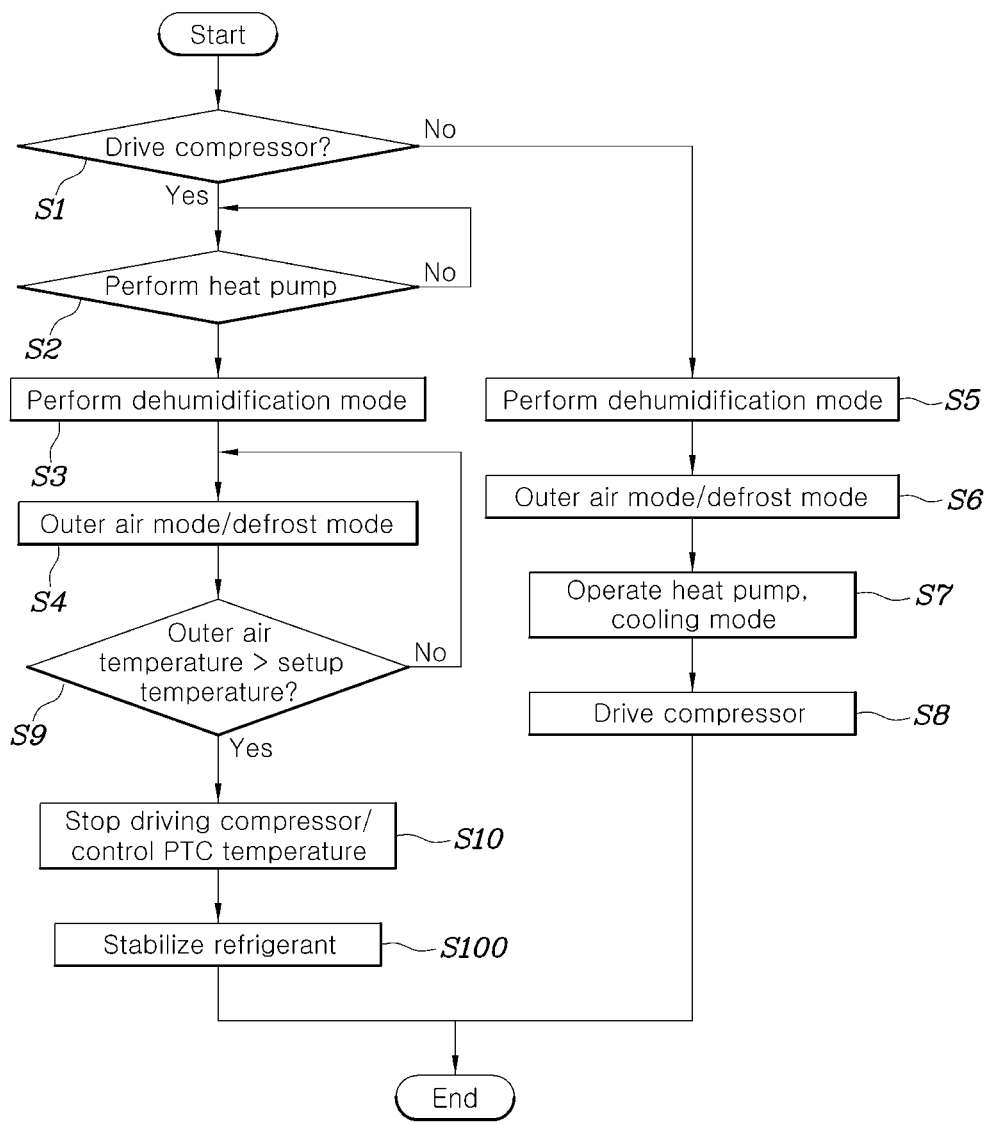
FIG. 5 is a control flowchart of an integrated air-conditioning system according to the present disclosure.
Figure 6:
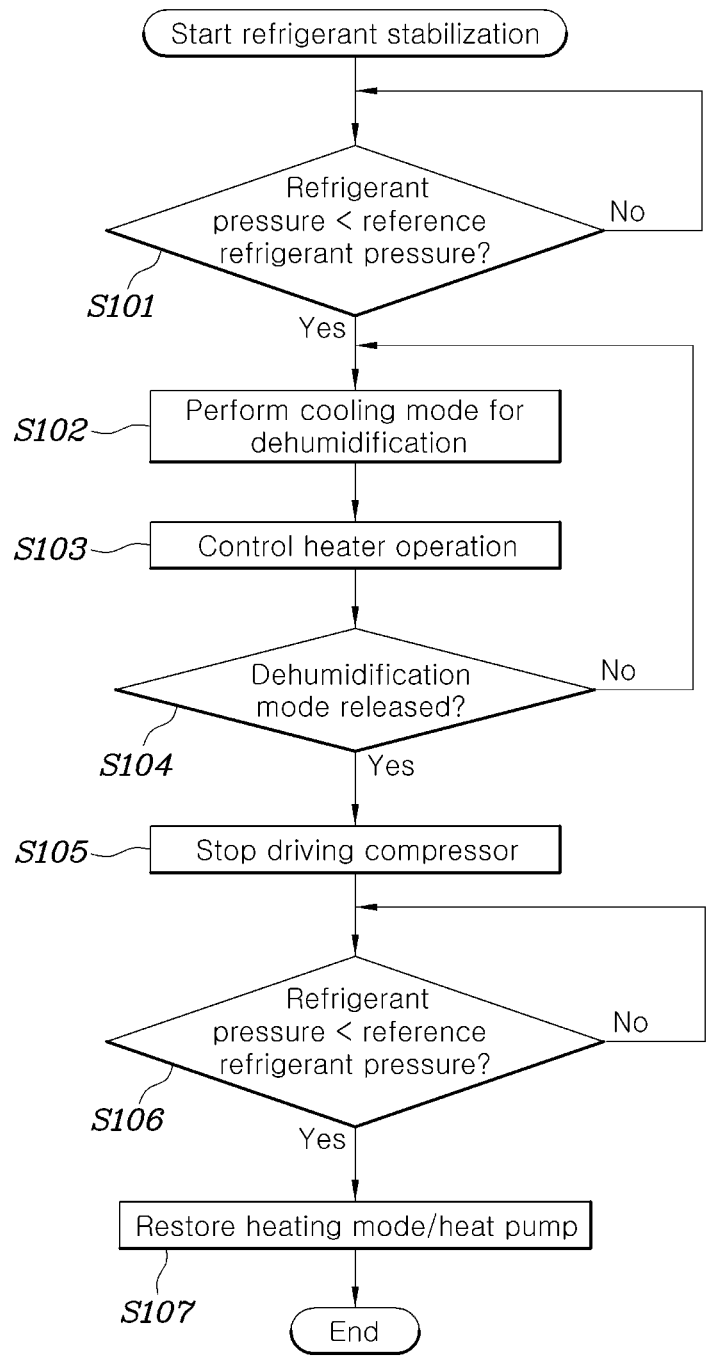
FIG. 6 is a flowchart illustrating an embodiment related to refrigerant stabilization in connection with the control flowchart illustrated in FIG. 5.

FIG. 5 is a control flowchart of an integrated air-conditioning system according to the present disclosure. FIG. 6 is a flowchart illustrating an embodiment related to refrigerant stabilization in connection with the control flowchart illustrated in FIG. 5. FIG. 7 is a flowchart illustrating another embodiment related to refrigerant stabilization in connection with the control flowchart illustrated in FIG. 5. FIG. 8 is a control flowchart related to dehumidification by an integrated air-conditioning system according to the present disclosure.

An integrated air-conditioning system according to the present disclosure includes, as illustrated in FIG. 1 and FIG. 2, a refrigerant line 10 through which refrigerant is circulated; a compressor 11 provided on the refrigerant line 10 for compressing refrigerant; an indoor heat exchanger 12 and an outdoor heat exchanger 13 provided on the refrigerant line 10, to which refrigerant is introduced after passing through the compressor 11 in the refrigerant line 10; a switching valve 14 provided on the refrigerant line 10, configured such that refrigerant discharged from the compressor 11 is selectively circulated to the indoor heat exchanger 12 or the outdoor heat exchanger 13; an integrated heat exchanger 15 provided on the refrigerant line 10, disposed such that refrigerant is introduced therein after passing through the indoor heat exchanger 12 or the outdoor heat exchanger 13 in the refrigerant line 10, the integrated heat exchanger 15 implementing a heat pump through heat exchange with another heat exchange medium; a first expander 16 provided on the refrigerant line 10, configures to selectively expand refrigerant introduced into the indoor heat exchanger 12; a second expander 17 provided on the refrigerant line 10, configured to selectively expand refrigerant introduced into the integrated heat exchanger 15; and a controller C configured to control the direction of circulation of refrigerant through the switching valve 14 and respective expanders according to a cooling mode in which the indoor heat exchanger 12 absorbs heat, a heating mode in which the indoor heat exchanger 12 radiates heat, or a dehumidification mode such that air-conditioning air appropriate for each mode is generated through the indoor heat exchanger 12.

According to the present disclosure, heating air or cooling air is selectively formed through the indoor heat exchanger 12 provided in the refrigerant line 10.

That is, high-temperature/high-pressure refrigerant compressed in the compressor 11 passes through the outdoor heat exchanger 13 by means of the switching valve 14, and is thus condensed. The condensed refrigerant expands through the first expander 16 and is circulated to the indoor heat exchanger 12. As a result, the indoor heat exchanger 12 may function as an evaporator, thereby forming cooling air through heat absorption.

In addition, if high-temperature/high-pressure refrigerant compressed in the compressor 11 is circulated to the indoor heat exchanger 12 by the switching valve 14, the indoor heat exchanger 12 may function as a condenser, thereby forming heating air through heat radiation. A heater 40 may be additionally configured together with the indoor heat exchanger 12, thereby supplementing heat necessary for heating by the heating air. The heater 40 may be configured as a PTC, and a separate door B may be additionally provided inside the air conditioner A, thereby securing the flow rate of air-conditioning air in a cooling or heating condition, and the cooling/heating efficiency.

In addition, an accumulator 18 may be provided at the front end of the compressor 11 in the refrigerant line 10. The accumulator 18 is configured to introduce evaporated refrigerant and to separate gas-state refrigerant.

Heating air and cooling air generated through the indoor heat exchanger 12 and the heater 40 in this manner may be emitted into an indoor space through the air conditioner A, thereby providing air-conditioning air according to the required indoor temperature. In addition, according to the present disclosure, the temperature of air-conditioning air is adjusted by a single indoor heat exchanger 12, thereby simplifying the cooling circuit.

Meanwhile, according to the present disclosure, a heat pump may be implemented by heat exchange between refrigerant and another heat exchange medium through the integrated heat exchanger 15.

To this end, the present disclosure further includes: a first cooling-water line 20 through which cooling water is circulated, the first cooling-water line 20 including a first water pump 21, a PE part 22, a first radiator 23, and a first valve 24, and the first cooling-water line 20 being connected to the integrated heat exchanger 15 such that cooling water exchanges heat with refrigerant, thereby ensuring that cooling water is selectively circulated to the first radiator 23 or the integrated heat exchanger 15 by the first valve 24; and a second cooling-water line 30 through which cooling water is circulated, the second cooling-water line 30 including a second water pump 31, a battery 32, a second radiator 33, and a second valve 34, and the second cooling-water line 30 being connected to the integrated heat exchanger 15 such that cooling water exchanges heat with refrigerant, thereby ensuring that cooling water is selectively circulated to the second radiator 33 or the integrated heat exchanger 15 by the second valve 34.

That is, cooling water is circulated in the first cooling-water line 20 by operations of the first water pump 21, thereby cooling the PE part 22. The PE part 22 refers to a part of electronic equipment of an electric mobility vehicle, and the temperature thereof needs to be managed to satisfy efficient operation conditions. After cooling the PE part 22, the cooling water is circulated to the integrated heat exchanger 15 or the first radiator 23 according to whether the first valve 24 is open or closed such that, when circulated to the integrated heat exchanger 15, the cooling water may exchange heat with refrigerant, thereby performing cooling and, when circulated to the first radiator 23, the cooling water may exchange heat with outer air, thereby performing cooling. As a result, the PE component 22 in the first cooling line 20 may be managed at an appropriate temperature, and the temperature of refrigerant may be adjusted through heat exchange between the cooling water and the refrigerant in the integrated heat exchanger 15, thereby implementing a heat pump.

Meanwhile, cooling water is circulated in the second cooling-water line 30 by operations of the second water pump 31, thereby cooling the battery 32. After cooling the battery 32, the cooling water is circulated to the integrated heat exchanger 15 or the second radiator 33 according to whether the second valve 34 is open or closed such that, when circulated to the integrated heat exchanger 15, the cooling water may exchange heat with refrigerant, thereby performing cooling and, when circulated to the second radiator 33, the cooling water may exchange heat with outer air, thereby performing cooling. As a result, the battery 32 in the second cooling line 30 may be managed at an appropriate temperature, and the temperature of refrigerant may be adjusted through heat exchange between the cooling water and the refrigerant in the integrated heat exchanger 15, thereby implementing a heat pump. The second cooling-water line 30 may further include a water-heating heater 35 for efficiently managing the temperature of the battery 32.

As such, according to the present disclosure, the temperature of air-conditioning air may be adjusted in the indoor heat exchanger 12 through circulation of refrigerant in the refrigerant line 10, and heat exchange between the refrigerant and cooling water circulated through the first cooling-water line 20 and the second cooling-water line 30 may guarantee that, in addition to temperature management of each part, a heat pump is implemented, thereby improving energy efficiency.

The cooling mode, heating mode, and dehumidification mode of the controller C according to the present disclosure described above will be described below in detail.

As illustrated in FIG. 3, the controller C controls the switching valve 14 in the cooling mode such that refrigerant discharged from the compressor 11 is circulated to the outdoor heat exchanger 13, the first expander 16 undergoes an expanding operation, thereby forming cooling air in the indoor heat exchanger 12, and the second expander 17 undergoes a selective expanding operation, thereby implementing a heat pump through heat exchange between the refrigerant and the heat exchange medium.

That is, the controller C controls the switching valve 14 in the cooling mode such that refrigerant discharged from the compressor 11 is moved to the outdoor heat exchanger 13, which then condenses the refrigerant, and the first expander 16 undergoes an expanding operation. Accordingly, the refrigerant that has been condensed after passing through the outdoor heat exchanger 13 is expanded through the first expander 16 and is then introduced into the indoor heat exchanger 12, which plays the role of an evaporator such that external heat is absorbed, thereby forming cooling air.

Moreover, the controller C selectively controls the expanding operation of the second expander 17 according to the temperature condition of the PE pall 22 or the battery 32 or the temperature condition of cooling water. Accordingly, during an expanding operation of the second expander 17, the refrigerant that has been condensed after passing through the outdoor heat exchanger 13 is expanded through the second expander 17 and then absorbs heat from another heat exchange medium (cooling water) in the integrated heat exchanger 15. As a result, not only is the cooling water cooled, but also the temperature of the refrigerant is managed, thereby enabling efficient heat management of the refrigerant and cooling water.

Meanwhile, as illustrated in FIG. 4, the controller C controls the switching valve 14 in the heating mode such that refrigerant discharged from the compressor 11 is circulated to the indoor heat exchanger 12, thereby forming heating air in the indoor heat exchanger 12, the first expander 16 undergoes an expanding operation, and the second expander 17 undergoes a selective opening operation, thereby implementing a heat pump through heat exchange between the refrigerant and the heat exchange medium.

That is, the controller C controls the switching valve 14 in the heating mode such that refrigerant discharged from the compressor 11 is moved to the indoor heat exchanger 12. Accordingly, the indoor heat exchanger 12 plays the role of a condenser and heats outer air through heat radiation, thereby forming heating air. The controller C may cause the first expander 16 to undergo an expanding operation such that the refrigerant that has passed through the indoor heat exchanger 12 is expanded, absorbs external heat in the outdoor heat exchanger 13, and is recirculated to the compressor 11.

Moreover, the controller C selectively controls opening of the second expander 17 according to the temperature condition of the PE part 22 or the battery 32 or the temperature condition of cooling water. Accordingly, during an opening operation of the second expander 17, the refrigerant that has passed through the indoor heat exchanger 12 and the first expander 16 absorbs heat from another heat exchange medium in the integrated heat exchanger 15 such that not only is the cooling water cooled, but also the temperature of the refrigerant is managed, thereby enabling efficient heat management of the refrigerant and cooling water.

Meanwhile, according to the present disclosure, cooling/heating is performed by a single indoor heat exchanger 12, and efficient dehumidification control of the indoor heat exchanger 12 is performed. Accordingly, the dehumidification mode may be performed identically to the cooling mode in FIG. 3, and the heater 40 may be additionally operated for dehumidification during heating.

In the present disclosure, the dehumidification mode may be implemented in various embodiments.

Control of the controller C according to an embodiment of the present disclosure may be applied in various embodiments according to the flowcharts in FIG. to 5 FIG. 7.

As illustrated in FIG. 5, the controller C performs a step (S1) of identifying whether the compressor 11 is driven in the dehumidification mode. When the compressor 11 is driven, the controller C performs a step (S2) of determining whether a heat pump is performed. When the heat pump is not performed, the controller C ensures that no control is performed according to the dehumidification mode. That is, when the heat pump is not performed, no heat exchange occurs through the integrated heat exchanger 15, thereby degrading the efficiency of the dehumidification operation through a refrigerant flow. For this reason, it is identified whether the heat pump is performed.

Thereafter, the controller C performs steps (S3-S6) of identifying whether the dehumidification mode is performed after identifying whether the compressor 11 is driven, and ensuring, when the dehumidification mode is performed, that outer air is defrosted/discharged both when the compressor 11 is driven and when the compressor 11 is not driven.

The user may manually manipulate the controller C to perform the dehumidification mode. Alternatively, the dehumidification mode may be selectively performed based on an input regarding whether humidity is generated, received from a separate humidity sensor SR1 mounted indoors or on the windshield.

Meanwhile, the controller C performs steps (S7 and S8) of ensuring that the compressor 11 is driven when the indoor temperature is adjusted or when the heat pump is performed in the dehumidification mode while the compressor 11 is not driven.

Meanwhile, the controller C performs a step (S9) of receiving an additional input of outer air temperature information through the temperature sensor SR2 in the case of a dehumidification mode during a heating mode, and ensuring that, if the outer air temperature is below a setup temperature, outer air is defrosted/discharged.

According to the present disclosure, cooling/heating is performed by a single indoor heat exchanger 12. In the cooling mode, the indoor heat exchanger 12 plays the role of an evaporator, thereby dehumidifying air. In the heating mode, the indoor heat exchanger 12 plays the role of a condenser, and air dehumidification may be limited. Therefore, according to the present disclosure, control is performed to ensure efficient dehumidification in the heating mode.

More specifically, in the case of a dehumidification mode during a heating mode, the controller C receives an input regarding outer air temperature through the temperature sensor SR2. The setup temperature may be 0° C.

That is, if the outer air temperature is below 0° C., moisture freezes. As a result, when the indoor heat exchanger 12 switches to the evaporator role, moisture on the surface of the indoor heat exchanger 12 may free, thereby blocking air circulation and damaging pails.

Therefore, the controller C performs only control for introducing outer air when the outer air temperature is below the setup temperature such that moisture is removed only by outer air.

Meanwhile, the controller C performs steps (S9 and S10) of receiving an input of outer air temperature information in the case of a dehumidification mode during a heating mode, ensuring that driving of the compressor 11 is stopped if the outer air temperature is equal to/higher than the setup temperature, and adjusting the temperature of heating air by controlling the heater 40.

That is, if the outer air temperature is equal to/higher than 0° C., water does not freeze, thereby satisfying the condition under which the indoor heat exchanger 12 can switch to the evaporator role and form dehumidification air. Accordingly, if the outer air temperature is equal to/higher than 0° C., the controller C ensures that the compressor 11 that has been driven to perform the heating mode stops being driven, and controls operations of the heater 40 in connection with insufficient heating heat of heating air such that the required indoor temperature can be satisfied.

According to the present disclosure, by stopping the driving of the compressor 11, the refrigerant pressure is decreased and thus stabilized. That is, in order to switch the indoor heat exchanger 12 from the condenser role to the evaporator role, the refrigerant circulation direction needs to be switched to the opposite direction. If the refrigerant circulation direction is switched while the refrigerant pressure is high, the rapid direction change of the high-pressure refrigerant may cause noise or damage to parts due to impacts in expanders or valves.

The controller C then performs a refrigerant stabilization step (S100) such that, by stabilizing the refrigerant pressure, a stable dehumidification mode is implemented. The refrigerant stabilization step (S100) according to the present disclosure may be performed as followed in order to stabilize the refrigerant pressure.

As an embodiment regarding refrigerant stabilization, as illustrated in FIG. 6, the controller C performs steps (S101 and S102) of receiving an additional input of refrigerant pressure information through a refrigerant pressure sensor S2, and performing control related to the cooling mode for dehumidification when the refrigerant pressure is equal to/lower than a reference pressure after the compressor 11 has stopped being driven.

The reference refrigerant pressure is a data value that may be predetermined through experiments such that, when the refrigerant circulation direction is switched, parts including respective expanders do not malfunction, and the refrigerant circulation direction can be stably switched.

The controller C compares a refrigerant pressure in a refrigerant line, which has been input through a refrigerant pressure sensor SR3, with the reference refrigerant pressure. If the input refrigerant pressure is equal to/lower than the reference refrigerant pressure, the controller C determines that the refrigerant pressure has been stabilized, and ensures that control related to the cooling mode for dehumidification is performed. That is, the controller C controls the switching valve 14 such that refrigerant discharged from the compressor 11 is moved to the outdoor heat exchanger 13, thereby condensing the refrigerant in the outdoor heat exchanger 13, and the first expander 16 undergoes an expanding operation. Accordingly, refrigerant that has been condensed after passing through the outdoor heat exchanger 13 is expanded through the first expander 16 and is introduced into the indoor heat exchanger 12 such that the indoor heat exchanger 12 plays the role of an evaporator, thereby providing dehumidified air into the indoor space.

In addition, the controller C may selectively further perform a step (S103) of selectively operating the heater 15 to adjust the temperature of air-conditioning air provided into the indoor space.

Meanwhile, the controller C performs steps (S104 and S105) of stopping the driving of the compressor 11 if the dehumidification mode is released.

The controller C may release the dehumidification mode according to the user's intent or may release the dehumidification mode upon determined that moisture has been removed through a separate moisture sensor SR1 mounted on the windshield.

In addition, the controller C performs steps (S106 and S107) of determining whether the refrigerant pressure is equal to/lower than the reference refrigerant pressure, and ensuring that control for heating mode and heat pump implementation is performed if the refrigerant pressure is equal to/lower than the reference refrigerant pressure. The controller C may delay position switching between inner/outer air doors in order to remove remaining condensed water generated in the indoor heat exchanger 12.

If the dehumidification mode is released, the controller C stabilizes the refrigerant in order to switch back to the heating mode. That is, the controller C compares a refrigerant pressure in the refrigerant line 10 input through the refrigerant pressure sensor SR3 with the reference refrigerant pressure, determines that the refrigerant pressure has been stabilized if the input refrigerant pressure is equal to/lower than the reference refrigerant pressure, and ensures that control related to the heating mode is again performed.

As such, according to the present disclosure, heating air may be provided according to the indoor temperature condition in a heating mode, and dehumidified air may be stably provided, thereby guaranteeing dehumidification efficiency.

Meanwhile, as another embodiment regarding refrigerant stabilization, as illustrated in FIG. 7, the controller C performs steps (S110 and Sill) of pre-storing a setup time at which the refrigerant pressure becomes a reference refrigerant pressure after the compressor 11 stops being driven, and performing control related to the cooling mode for dehumidification if the time elapsed since the compressor 11 has stopped being driven exceeds a setup time.

The setup time is a data value that may be predetermined through experiments such that, when the refrigerant circulation direction is switched, parts including respective expanders do not malfunction, and the refrigerant circulation direction can be stably switched.

As such, the controller C identifies the time elapsed since the compressor 11 has stopped being driven, determines that the refrigerant pressure has been stabilized if the elapsed time exceeds the setup time, and ensured that control related to the cooling mode is performed. That is, the controller C controls the switching valve 14 such that refrigerant discharged from the compressor 11 is moved to the outdoor heat exchanger 13, thereby condensing the refrigerant in the outdoor heat exchanger 13, and the first expander 16 undergoes an expanding operation. Accordingly, refrigerant that has been condensed after passing through the outdoor heat exchanger 13 is expanded through the first expander 16 and is introduced into the indoor heat exchanger 12 such that the indoor heat exchanger 12 plays the role of an evaporator, thereby providing dehumidified air into the indoor space.

In addition, the controller C may further perform a step (S113) of selectively operating the heater 15 in order to adjust the temperature of air-conditioning air provided into the indoor space.

Meanwhile, the controller C performs steps (S114 and S115) of stopping the driving of the compressor 11 if the dehumidification mode is released.

The controller C may release the dehumidification mode according to the user's intent or may release the dehumidification mode upon determined that moisture has been removed through a separate moisture sensor SR1 mounted on the windshield.

In addition, the controller C performs steps (S116 and S117) of ensuring that control for heating mode and heat pump implementation is performed if the time elapsed since the compressor 11 has stopped being driven exceeds the setup time. The controller C may delay position switching between inner/outer air doors in order to remove remaining condensed water generated in the indoor heat exchanger 12.

If the dehumidification mode is released, the controller C stabilizes the refrigerant in order to switch back to the heating mode. That is, the controller C stops the driving of the compressor 11, determines that the refrigerant pressure has been stabilized if the time elapsed since the compressor 11 has stopped being driven exceeds the setup time, and ensures that control related to the heating mode is again performed.

As such, according to the present disclosure, heating air may be provided according to the indoor temperature condition in the heating mode, and dehumidified air may be stably provided, thereby guaranteeing dehumidification efficiency.

Meanwhile, the present disclosure prevents contamination related to molds and microorganisms due to moisture generated in the indoor heat exchanger 12 after the mobility vehicle is powered off.

As illustrated in FIG. 8, when power is off after cooling air is formed through the indoor heat exchanger 12, the controller C identifies whether the time elapsed since the power off exceeds a predetermined time and, if the predetermined time is exceeded, maintains control related to the heating mode for a preset period of drying time.

In addition, the controller C introduces outer air, drives a blower, and stops the driving of the compressor if the temperature of air in the heating mode reaches a preset drying temperature.

That is, the controller C performs a step (S11) of identifying whether the indoor heat exchanger 12 plays the role of an evaporator. The controller C may further perform a step (S12) of identifying whether the cooling mode in which the indoor heat exchanger 12 plays the role of an evaporator exceeds a minimum time necessary to generate condensed water.

If the mobility vehicle is then powered off, the controller C performs steps (S13 and S14) of identifying whether the time elapsed since the power off exceeds a predetermined time. The predetermined time may be about 30 minutes. If contamination prevention control is performed immediately after the mobility vehicle is powered off, indoor occupants may feel uncomfortable, and damages to parts or noise may occur if the refrigerant circulation direction is switched. Therefore, the corresponding control is performed if a predetermined time lapses after powering off the mobility vehicle.

If a predetermined time lapses after powering off the mobility vehicle, the controller C performs steps (S15 and S16) of maintaining control related to the heating mode for a drying time. The drying time may be determined as the time necessary to remove moisture generated in the indoor heat exchanger 12 due to heat radiated by the indoor heat exchanger 12 playing the role of a condenser.

Moreover, the controller C performs steps (S17 and S18) of introducing outer air and driving a blower. In addition, the controller C performs steps (S19 and S20) of stopping the driving of the compressor if the temperature of the indoor heat exchanger 12 elevated by the heating mode reaches a setup drying temperature. The drying temperature may be determined as a temperature of air passing through the indoor heat exchanger 12, at which condensed water can be easily removed.

That is, the blower provided in the air conditioner A may be driven together, and moisture generated in the indoor heat exchanger 12 by introducing outer air may be quickly removed. In addition, removal of condensed water generated in the indoor heat exchanger 12 may be accelerated if the indoor heat exchanger 12 reaches the drying temperature.

As a result, the indoor heat exchanger 12 may be prevented from being contaminated by moisture after the mobility vehicle is powered off, thereby ensuring that sanitary air-conditioning air is continuously provided into the indoor space.

An integrated air-conditioning system having the above-mentioned structure is advantageous in that the temperature of air-conditioning air provided to an indoor space is adjusted by a single heat exchanger, thereby simplifying the cooling circuit, and no temperature adjustment door is used to adjust the temperature of air-conditioning air with regard to each mode, thereby reducing the air conditioner package.

In addition, when a single indoor heat exchanger is used for dehumidification, the pressure of refrigerant circulated in the indoor heat exchanger is stabilized, thereby stabilizing parts on the refrigerant line, and the heat-absorbing or heat-radiating operation of the indoor heat exchanger is optimized.

What is claimed is:

1. A system comprising:
   a compressor connected to a refrigerant line, the compressor configured to compress a refrigerant;
   an indoor heat exchanger and an outdoor heat exchanger connected to the refrigerant line;
   a switching valve connected to the refrigerant line, the switching valve arranged between the compressor and the indoor heat exchanger and between the indoor heat exchanger and the outdoor heat exchanger and configured to selectively circulate the refrigerant from the compressor either first to the indoor heat exchanger or first to the outdoor heat exchanger;
   an integrated heat exchanger connected to the refrigerant line, the integrated heat exchanger configured to receive the refrigerant from the indoor heat exchanger or the outdoor heat exchanger, wherein the integrated heat exchanger is configured to act as a heat pump exchanging heat between the refrigerant and a heat exchange medium;
   a first expander connected to the refrigerant line, the first expander configured to selectively expand the refrigerant related to the indoor heat exchanger;
   a second expander connected to the refrigerant line, the second expander configured to selectively expand the refrigerant related to the integrated heat exchanger; and
   a controller configured to control refrigerant circulation directions through the switching valve according to a cooling mode, a heating mode, or a dehumidification mode such that the indoor heat exchanger is able to provide air-conditioning air based on each mode.

2. The system of claim 1, wherein the system is configured to discharge outer air when in the dehumidification mode and when the compressor is not driven.

3. The system of claim 1, wherein the controller is configured, when in the cooling mode, to:
   control the switching valve such that the refrigerant discharged from the compressor is first circulated to the outdoor heat exchanger;
   control the first expander to expand the refrigerant so that the indoor heat exchanger is able to provide cooled air; and
   control the second expander so that the integrated heat exchanger is able to exchange heat between the refrigerant and the heat exchange medium.

4. The system of claim 1, wherein the controller is configured to:
   determine whether a time since powering off after cooling air exceeds a predetermined time; and
   maintain the heating mode for a preset drying time when the predetermined time is exceeded.

5. The system of claim 1, further comprising a first cooling-water line connected to a first water pump, a part of electronic equipment (PE) part, a first radiator, a first valve, a reservoir, and the integrated heat exchanger, wherein the integrated heat exchanger is configured to exchange heat between a cooling water and the refrigerant, and wherein the first valve is configured to let the cooling water selectively circulate to the first radiator or the integrated heat exchanger.

6. The system of claim 5, further comprising a second cooling-water line connected to a second water pump, a battery, a second radiator, a second valve, the reservoir and the integrated heat exchanger, wherein the integrated heat exchanger is configured to exchange heat between the cooling water and the refrigerant, and wherein the second valve is configured to let the cooling water selectively circulate to the second radiator or the integrated heat exchanger.

7. The system of claim 5, further comprising a second cooling-water line connected to a second water pump, a battery, a second radiator, a second valve and the integrated heat exchanger, wherein the integrated heat exchanger is configured to exchange heat between a cooling water and the refrigerant, and wherein the second valve is configured to let the cooling water selectively circulate to the second radiator or the integrated heat exchanger.

8. The system of claim 1, wherein the controller is configured, when in the heating mode, to:
   control the switching valve such that refrigerant discharged from the compressor is circulated first to the indoor heat exchanger so that the indoor heat exchanger is able to provide heated air;
   control the first expander to expand the refrigerant; and
   control the second expander so that the integrated heat exchanger is able to exchange heat between the refrigerant and the heat exchange medium.

9. The system of claim 8, further comprising:
   a heater configured to provide heated air,
   wherein the controller is configured to operate the heater solely by heating air provided in the indoor heat exchanger.

10. The system of claim 9, wherein the system is configured, when turning on the dehumidification mode during the heating mode, to discharge outer air when an outer air temperature is below a setup temperature.

11. The system of claim 9, wherein the controller is configured, when turning on the dehumidification mode during the heating mode, to:
    stop driving the compressor when an outer air temperature is equal to or higher than a setup temperature, and
    control the heater in order to adjust a temperature of the heated air.

12. The system of claim 11, wherein the controller is configured to control the cooling mode when a refrigerant pressure is equal to or lower than a first reference refrigerant pressure after stopping driving the compressor.

13. The system of claim 12, wherein the controller is configured to:
    stop driving the compressor when the dehumidification mode is set; and
    control the heating mode when the refrigerant pressure is equal to or lower than a second reference refrigerant pressure after stopping driving the compressor.

14. The system of claim 11, wherein the controller is configured to:
    pre-store a first setup time at which a refrigerant pressure reaches a reference refrigerant pressure after stopping driving the compressor; and
    control the cooling mode when a time exceeds the first setup time.

15. The system of claim 14, wherein the controller is configured to:
    stop driving the compressor when the dehumidification mode is set; and
    control the heating mode when a time exceeds a second setup time.

16. A system comprising:
    a switching valve;

a compressor connected to the switching valve via a first refrigerant line loop;

an indoor heat exchanger and an outdoor heat exchanger connected to the switching valve via a second refrigerant line loop, wherein the switching valve is located between the compressor and the indoor heat exchanger and between the indoor heat exchanger and the outdoor heat exchange and is configured to selectively circulate a refrigerant from the compressor either first to the indoor heat exchanger or first to the outdoor heat exchanger;

an integrated heat exchanger connected to the first refrigerant line loop and the second refrigerant line loop, wherein the integrated heat exchanger is configured to receive the refrigerant from the indoor heat exchanger or the outdoor heat exchanger;

a first expander connected to the second refrigerant line loop, the first expander configured to selectively expand the refrigerant related to the indoor heat exchanger;

a second expander connected to the integrated heat exchanger, the second expander configured to selectively expand the refrigerant related to the integrated heat exchanger; and a controller configured to control refrigerant circulation directions through the switching valve according to a cooling mode, a heating mode, or a dehumidification mode such that the indoor heat exchanger is able to provide air-conditioning air based on each mode.

17. The system of claim 16, further comprising:

a first cooling-water line connected to a first water pump, a part of electronic equipment (PE) part, a first radiator, a first valve, a reservoir, and the integrated heat exchanger, wherein the integrated heat exchanger is configured to exchange heat between cooling water and the refrigerant, and wherein the first valve is configured to let the cooling water selectively circulate to the first radiator or the integrated heat exchanger; and a second cooling-water line connected to a second water pump, a battery, a second radiator, a second valve, the reservoir and the integrated heat exchanger, wherein the integrated heat exchanger is configured to exchange heat between the cooling water and the refrigerant, and wherein the second valve is configured to let the cooling water selectively circulate to the second radiator or the integrated heat exchanger.

18. The system of claim 16, wherein the controller is configured, when in the cooling mode, to:

control the switching valve such that the refrigerant discharged from the compressor is circulated first to the outdoor heat exchanger, control the first expander to expand the refrigerant so that the indoor heat exchanger is able to provide cooled air, and control the second expander so that the integrated heat exchanger is able to exchange heat between the refrigerant and a heat exchange medium, and wherein the controller is configured, when in the heating mode, to:

control the switching valve such that refrigerant discharged from the compressor is circulated first to the indoor heat exchanger so that the indoor heat exchanger is able to provide heated air, control the first expander to expand the refrigerant, and control the second expander so that the integrated heat exchanger is able to exchange heat between the refrigerant and the heat exchange medium.

19. A system comprising:

a compressor connected to a refrigerant line, the compressor configured to compress a refrigerant;

an indoor heat exchanger and an outdoor heat exchanger connected to the refrigerant line;

a switching valve connected to the refrigerant line, the switching valve configured to selectively circulate the refrigerant from the compressor either first to the indoor heat exchanger or first to the outdoor heat exchanger;

an integrated heat exchanger connected to the refrigerant line, the integrated heat exchanger configured to receive the refrigerant from the indoor heat exchanger or the outdoor heat exchanger, wherein the integrated heat exchanger is configured to act as a heat pump exchanging heat between the refrigerant and a heat exchange medium;

a first expander connected to the refrigerant line, the first expander configured to selectively expand the refrigerant related to the indoor heat exchanger;

a second expander connected to the refrigerant line, the second expander configured to selectively expand the refrigerant related to the integrated heat exchanger; and a controller configured to:

control refrigerant circulation directions through the switching valve according to a cooling mode, a heating mode, or a dehumidification mode such that the indoor heat exchanger is able to provide air-conditioning air based on each mode;

determine whether a time since powering off after cooling air exceeds a predetermined time; and maintain the heating mode for a preset drying time when the predetermined time is exceeded.

20. The system of claim 19, wherein the controller is configured to stop driving the compressor when a temperature of the indoor heat exchanger elevated by the heating mode reaches a preset drying temperature.

* * * * *